Nov. 20, 1923.  1,475,095
H. VAN HEES
FLYTRAP
Filed Aug. 31, 1922
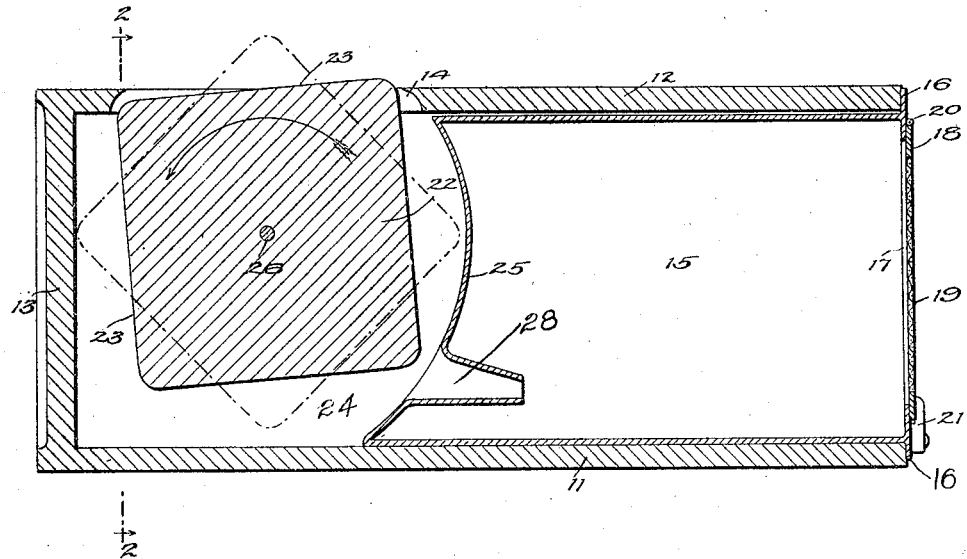
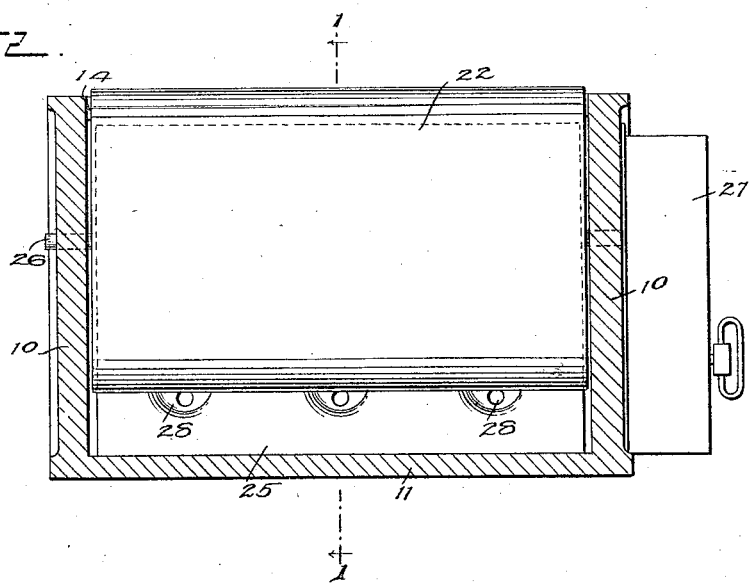
WITNESSES
H. J. Walker
H. Harrison Ost
INVENTOR
Henri van Hees
BY
ATTORNEYS Patented Nov. 20, 1923.

1,475,095

UNITED STATES PATENT OFFICE.

HENRI VAN HEES, OF MADISON, NEW JERSEY.

FLYTRAP.

Application filed August 31, 1922. Serial No. 585,440.

*To all whom it may concern:*

Be it known that I, HENRI VAN HEES, a subject of the King of Belgium, and a resident of Madison, in the county of Morris and State of New Jersey, have invented a new and Improved Flytrap, of which the following is a full, clear, and exact description.

This invention has relation to trapping devices and has particular reference to a fly trap.

The primary object of the present invention is to provide a simple, inexpensive and effective apparatus for trapping flies, which apparatus operates continuously.

As a further object the invention contemplates an improved fly trap which automatically traps and collects the flies in a suitable receptacle, which is removable therefrom for destroying the same.

With the above recited and other objects in view, the invention resides in the novel construction set forth in the following specification, particularly pointed out in the appended claim and illustrated in the accompanying drawing, it being understood that the right is reserved to embodiments other than those actually illustrated herein to the full extent indicated by the general meaning of the terms in which the claim is expressed.

In the drawing—

Figure 1 is a longitudinal sectional view through a trap constructed in accordance with the invention, the same being taken on the line indicated at 1—1 of Fig. 2.

Fig. 2 is a transverse sectional view therethrough taken approximately on the line 2—2 of Fig. 1.

Referring to the drawings by characters of reference, the trap comprises a body consisting of side walls, 10 a bottom wall 11, a top wall 12 and an end wall 13. Adjacent the closed end the top wall is provided with an opening 14, while within the opposite open end a receptacle 15 is slidable. The receptacle 15 is provided at its outer end with a projecting marginal flange 16 which limits the inward sliding movement thereof by contact with the ends of the side, top and bottom walls. The outer end of the receptacle is provided with an opening 17 which is closed by means of a cover 18 having a wire mesh panel 19 which permits of observation of the interior of the receptacle. The cover 18 is hinged as at 20 and the free opposite edge is maintained in closed relation to the opening 17 by a suitable catch element 21. A rotary trapping member 22 having a plurality of flat outer faces 23 is mounted for rotation within the closed end of the body in the trapping chamber 24 defined by the end wall 13 of the body and the inner end wall 25 of the receptacle 15. The trapping member 22 is secured to a drive shaft 26 which extends through the opposite side walls 10 of the body and is connected with a suitable spring motor (not shown) arranged in a housing 27 secured to the outer side of one of the side walls 10. The inner end wall 25 of the receptacle 15 is of arcuate formation and is struck on an arc concentric to the axial center or center of rotation of the drive shaft and trapping member 22 whereby the corners of the trapping member are permitted a slight clearance therebetween during the rotation of the member 22. The shaft is so arranged as to dispose the uppermost flat face 23 when horizontal in a plane with the upper face of the top wall 12. The inner wall 25 of the receptacle 15 is provided with inwardly extending chutes 28 of substantially conical formation to provide communicating passages between the trapping chamber 24 and the interior of the receptacle, which passages are of gradually decreasing diameter.

In use and operation a suitable bait is spread over the surfaces 23 of the trapping member and the same is driven very slowly in the direction indicated by the arrow in Fig. 1. As the flies light on the baited surfaces 23, they will be slowly carried by the trapping member into the space or trapping chamber 24, until the trapping member 22 has assumed the position illustrated in dotted lines in Fig. 1. At this time the light will be substantially cut off and the flies in seeking an avenue of escape, will observe the light through the passages to the trapping chamber 15, their natural instinct impelling them to enter. In the meantime the remaining baited faces will be successively presented through the opening 14 in the top wall to continuously effect the trapping operation. When the receptacle 15 is full, the same is withdrawn from the body to destroy the flies which have been trapped.

I claim:

A fly trap comprising a boxlike body having an open end and a closed end, said body having a rectangular opening in its top adjacent the closed end, a receptacle insertable into the open end having inwardly projecting conical passages in its inner end and a mesh panel in its outer end, said inner end of the receptacle being substantially in alignment with one edge of the opening in the top of the body and defining in conjunction with the closed end and walls a trapping chamber, a trapping member of rectangular configuration rotatably mounted in said trapping chamber, said trapping member being of substantially the same cross-sectional area as the opening in the top of the body and having its uppermost face in alignment with the top of the body and its lowermost face in alignment with the conical passages in the receptacle whereby light enters the trapping chamber only through said conical passages at the bottom of the trapping chamber.

HENRI van HEES.